March 9, 1926.                                                   1,576,396
                              N. E. WOOD
                     SAFETY DEVICE FOR AUTOMOBILES
                         Filed Sept. 12, 1925
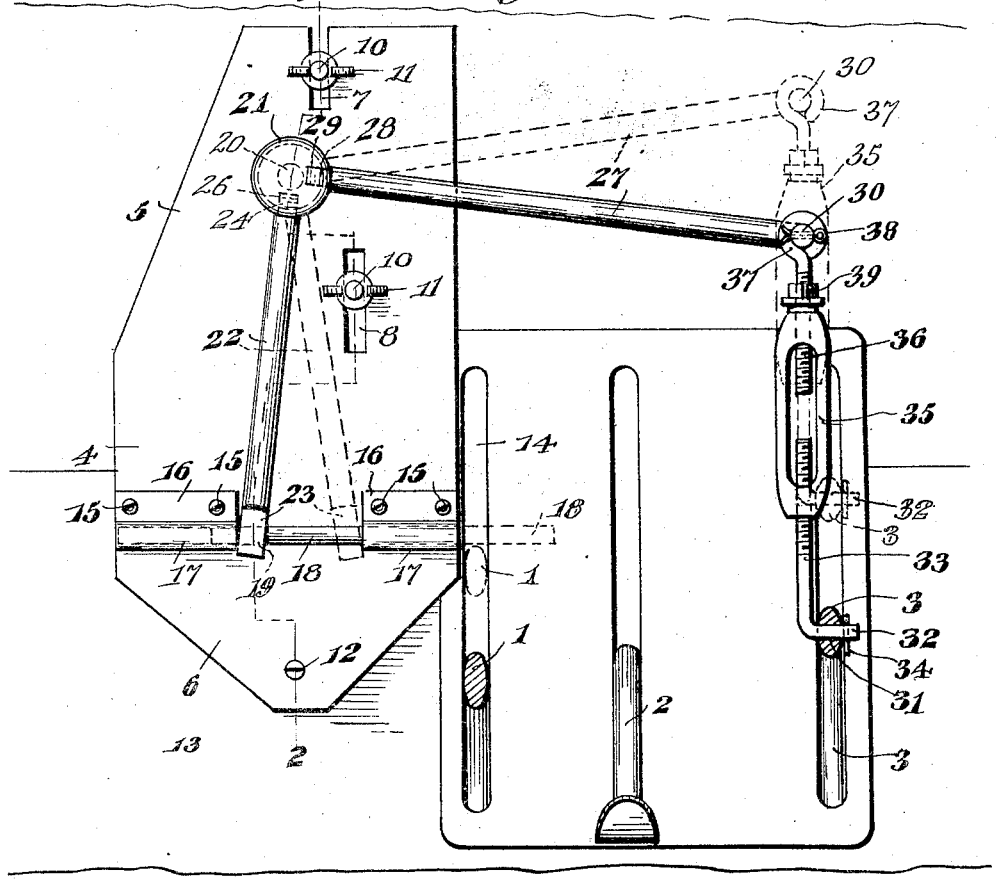
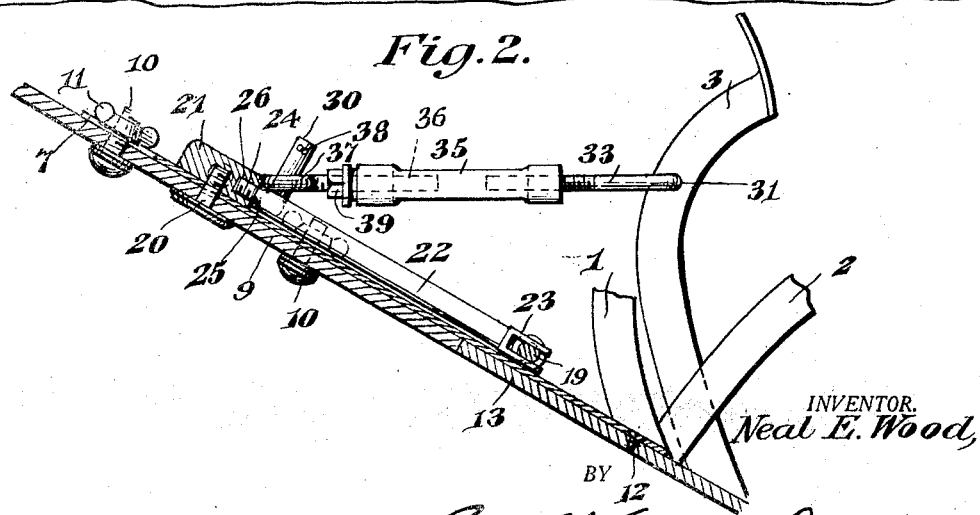
INVENTOR.
Neal E. Wood,
BY
Geo. F. Kimmel, ATTORNEY.

Patented Mar. 9, 1926.

1,576,396

UNITED STATES PATENT OFFICE.

NEAL ERASTUS WOOD, OF CHANUTE, KANSAS.

SAFETY DEVICE FOR AUTOMOBILES.

Application filed September 12, 1925. Serial No. 56,054.

*To all whom it may concern:*

Be it known that I, NEAL ERASTUS WOOD, a citizen of the United States, residing at Chanute, in the county of Neosho and State of Kansas, have invented certain new and useful Improvements in Safety Devices for Automobiles, of which the following is a specification.

This invention relates to a safety device for use in connection with clutch pedals of cars of the Ford type, and has for its object to provide, in a manner as hereinafter set forth, a clutch pedal safety device adapted to be actuated on the application of the brake pedal of the car for the purpose of arresting movement of the clutch pedal from neutral position until the brake pedal is released, and under such conditions overcoming any possibility of the actuation of the clutch pedal to prevent stoppage of the car on the application of the brakes from the brake pedal.

Further objects of the invention are to provide, in a manner as hereinafter set forth, a safety device for the purpose referred to, which is simple in its construction and arrangement, strong, durable, thoroughly efficient in its use, conveniently installed, and inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views;

Figure 1, is an elevation of a safety device, in accordance with this invention, showing the adaptation thereof with respect to the foot boards and brake and clutch pedals of a motor vehicle, and further illustrating in full and dotted lines, respectively, the device in active and inactive positions.

Figure 2, is a section on line 2—2, Figure 1.

Referring to the drawings in detail, 1, 2 and 3 indicate respectively, the clutch, reverse and brake pedals of a motor vehicle. A safety device, in accordance with this invention, comprising a base plate 4 formed of a reduced upper part 5 and a tapered lower part 6. The part 5 is of greater length than the part 6 and is attached to be adjustably positioned against the upper foot board of a vehicle. The plate 4 is formed with a pair of lengthwise extending slots 7, 8 arranged out of alignment with respect to each other. The slot 7 is open at its upper end and arranged at the upper portion of the part 5 of the plate. The slot 8 is closed at each end and is positioned at the lower portion of the part 5. Carried by the upper foot board 9 are bolts 10 which extend through the slots 7 and 8 and carry wing nuts 11 engageable with the upper face of the plate 4 for the purpose of clamping it against the foot board 9. The slots 7, 8; bolts 10; nuts 11 provide means whereby the plate 4 can be adjustably positioned on the upper foot board 9, as well as being detachably clamped thereto. The part 6, after the plate 4 has been adjusted, is fixedly secured by the holdfast device 12 to the lower foot board 13. The plate 4 is positioned in proximity to one side of the clutch pedal 1 and projects above the slots 14 and through which extend the pedals 1, 2 and 3.

The plate 4 in proximity to the lower part 6 thereof, has fixedly secured to the outer face thereof, by the holdfast devices 15, a pair of rectangular plates 16, each formed at its lower side with a guide barrel 17 disposed transversely with respect to the plate 4. The guide barrels 17 are arranged in alignment and the inner ends thereof are spaced from each other and mounted in the barrels 17 is a slidable locking bolt 18, of cylindrical contour, and which is formed between its transverse center and its inner end with a reduced portion 19.

Extending through the upper part 5, of the plate 4, and positioned between the lower end of the slot 7 and upper end of the slot 8, as well as extending through the foot board 9, is a pivot bolt 20 having secured to the upper end thereof, so as to bodily move with the bolt 20, a circular disk or head 21. Secured to the disk 21 and depending therefrom is a lever arm 22 provided at its lower end with a yoke 23 which straddles the reduced portion 19 of the bolt 18. The upper end of the lever arm 22 is reduced, as indicated at 24 thereby providing a shoulder 25. The reduced upper end 24 of the lever arm 22 is peripherally threaded and engages with the threads formed on the wall of a socket 26 provided in the disk 21.

Connected to the disk 21 and extending substantially at right angles with respect to the lever arm 22, is a lever arm 27 of greater length than the arm 22. The inner end of the arm 27 is reduced as at 28 and has threaded engagement with the wall of a socket 29 formed in the disk 21 substantially at right angles to the socket 26. The outer end of the lever arm 27 is formed with a right angularly disposed upwardly projecting extension 30. The lever arm 27 extends over the several clutch pedals to a point slightly beyond the brake pedal 3.

The brake pedal 3 is formed with an opening 31 through which extends a projection 32 formed integral with and at right angles to the lower end of an upwardly extending bolt 33. The projection 32 has its free end extended from one side of the brake pedal 3 and is connected to the latter by a cotter pin 34 which is mounted in the projection 32 interiorly of the pedal 3. The bolt 33 is positioned on the outer side of the brake pedal 3 and has mounted on its upper threaded terminal portion a turnbuckle 35, which threadably engages with the threaded lower terminal portion of an eye-bolt 36. The head 37 of the bolt 36 is in the form of an eye and projecting through the same is the extension 30. The extension 30 is connected to the head 37 by a cotter pin 38. A stop nut 39 is carried by the bolt 36 above the turnbuckle 35.

The bolt 18, when slid to active position, is arranged in the path of the clutch pedal 1, to prevent the latter from being shifted from neutral and the arrangement of the device with respect to the clutch and brake pedals is such that, under normal conditions, the various elements of the device will be as illustrated in full lines in Figure 1, but on the application of brake pedal, the lever arms 22 and 27 will be shifted to the dotted line position shown in Figure 1, and when moved to such positions, the lever arm 22 will slide the bolt 28 to the dotted line position shown in Figure 1 and which will be in the path of the clutch pedal 1 to prevent the shifting of the latter from neutral until after the brake pedal has been released. When the brake pedal 1 is released, the bolt 18 and lever arms 22 and 27 automatically assume the full line position shown in Figure 1. The lever arm 27 is disposed a substantial distance above the pedals 1, 2 and 3 so as not to interfere in any manner with the action thereof. The provision for the adjusting of the plate 4 on the upper foot board 9 enables the positioning of the device in a proper manner to accommodate tight or loose brake bands. The turnbuckle 35, in connection with the threaded bolts 33 and 36, provides means for adjusting the throw of the lever arm 27 and the stop nut 39 provides means for maintaining the turnbuckle in adjusted position.

It is to be understood that any suitable form of locking bolt, with its support, can be employed. The construction shown is the preferable one. It is furthermore to be understood that in lieu of employing the coupling device, as shown, between the elements 3 and 27, a coiled spring could be substituted.

It is thought that the many advantages of a safety device, in accordance with this invention, and for the purpose set forth, can be readily understood, and although the preferred embodiment of the invention is as illustrated and described, yet it is to be understood that changes in the details of construction can be had which fall within the scope of the invention as claimed.

What I claim is:

1. A safety device for the purpose set forth comprising a clutch pedal locking bolt shiftable to and from locking position with respect to such pedal, a shiftably mounted disk, a pair of lever arms disposed at an angle with respect to each other and secured to and extending from said disk, one of said arms engaging with said bolt for moving it to and from locking position when said disk is shifted, and means connected to the other of said lever arms and actuated from a brake pedal on the application and release of the latter for shifting said disk alternately in opposite directions to move said bolt to and from locking position.

2. A safety device for the purpose set forth comprising a clutch pedal locking bolt shiftable to and from locking position with respect to such pedal, a shiftably mounted disk, a pair of lever arms disposed at an angle with respect to each other and secured to and extending from said disk, one of said arms engaging with said bolt for moving it to and from locking position when said disk is shifted, means connected to the other of said lever arms and actuated from a brake pedal on the application and release of the latter for shifting said disk alternately in opposite directions to move said bolt to and from locking position, and a supporting plate for said disk and bolt adapted to be secured to the foot board of a vehicle.

3. A safety device for the purpose set forth comprising a clutch pedal locking bolt shiftable to and from locking position with respect to such pedal, a shiftably mounted disk, a pair of lever arms disposed at an angle with respect to each other and secured to and extending from said disk, one of said arms engaging with said bolt for moving it to and from locking position when said disk is shifted, means connected to the other of said lever arms and actuated from a brake pedal on the application and release of the latter for shifting said disk alternately in opposite directions to move said bolt to and from locking position, a supporting plate for said disk and bolt adapted to be secured to the foot board of a vehicle, and means to provide for adjustably positioning said plate.

4. A safety device for the purpose set forth comprising a clutch pedal locking bolt shiftable to and from locking position with respect to such pedal, a shiftably mounted disk, a pair of lever arms disposed at an angle with respect to each other and secured to and extending from said disk, one of said arms engaging with said bolt for moving it to and from locking position when said disk is shifted, means connected to the other of said lever arms and actuated from a brake pedal on the application and release of the latter for shifting said disk alternately in opposite directions to move said bolt to and from locking position, a supporting plate for said disk and bolt adapted to be secured to the foot board of a vehicle, and a pair of guides carried by said plate for said bolt.

5. A safety device for the purpose set forth comprising a clutch pedal locking bolt shiftable to and from locking position with respect to such pedal, a shiftably mounted disk, a pair of lever arms disposed at an angle with respect to each other and secured to and extending from said disk, one of said arms engaging with said bolt for moving it to and from locking position when said disk is shifted, and lengthwise adjustable means connected to the other of said lever arms and actuated from a brake pedal on the application and release of the latter for shifting said disk alternately in opposite directions to move said bolt to and from locking position.

6. A safety device for the purpose set forth comprising a clutch pedal locking bolt shiftable to and from locking position with respect to such pedal, a shiftably mounted disk, a pair of lever arms disposed at an angle with respect to each other and secured to and extending from said disk, one of said arms engaging with said bolt for moving it to and from locking position when said disk is shifted, lengthwise adjustable means connected to the other of said lever arms and actuated from a brake pedal on the application and release of the latter for shifting said disk alternately in opposite directions to move said bolt to and from locking position, a supporting plate for said disk and bolt adapted to be secured to the foot board of a vehicle, and a pair of guides secured to said plate for said bolt.

In testimony whereof, I affix my signature hereto.

NEAL E. WOOD.